CODING ARRANGEMENTS FOR ELECTRIC PULSE CODE MODULATION SYSTEMS

Filed June 8, 1959 4 Sheets-Sheet 1

Inventors
K.W. CATTERMOLE - D.R. BARBER
By C. H. Suydam
AGENT

Inventors
K.W. CATTERMOLE - D.R.BARBER
By C.H. Suydam
AGENT

Inventors
K.W. CATTERMOLE-D.R.BARBER
By C.H. Suydam
AGENT

Inventors
K.W. CATTERMOLE - D.R.BARBER
By C. H. Suydam
AGENT 3,115,624

CODING ARRANGEMENTS FOR ELECTRIC PULSE CODE MODULATION SYSTEMS

Kenneth William Cattermole and Donald Robert Barber, London, England, assignors to International Standard Electric Corporation, New York, N.Y.

Filed June 8, 1959, Ser. No. 818,944
Claims priority, application Great Britain June 25, 1958
11 Claims. (Cl. 340—347)

The present invention relates to coding arrangements for electric pulse code modulation systems of communication.

It concerns coders which are adapted to produce a particular form of the binary code by the use of which the coders are simplified.

It has been recognised that advantages can be gained by the use of a coder which includes a separate coding element for each signal level to be represented, particularly for coders which have to be operated at very high speeds. In that case the coding element operated in response to a given signal level has to produce all the digits of the corresponding code combination, and these digits are usually produced simultaneously and have afterwards to be rearranged so that they can be transmitted in sequence.

According to the invention, with an arrangement of this type, the digits of each code combination are produced directly in sequence with a coder which operates according to a particular form of the binary code which will be called a "serial binary code," and which has the property that the two code combinations respectively representing the two levels of every pair of adjacent levels contain the same block of $n-1$ adjacent digits, in the case of a code of $n$ digits.

This special code can have, in addition, certain other useful properties which will be explained in detail below.

The invention will be described with reference to the accompanying drawings, in which.

Figures 1, 2, 3:
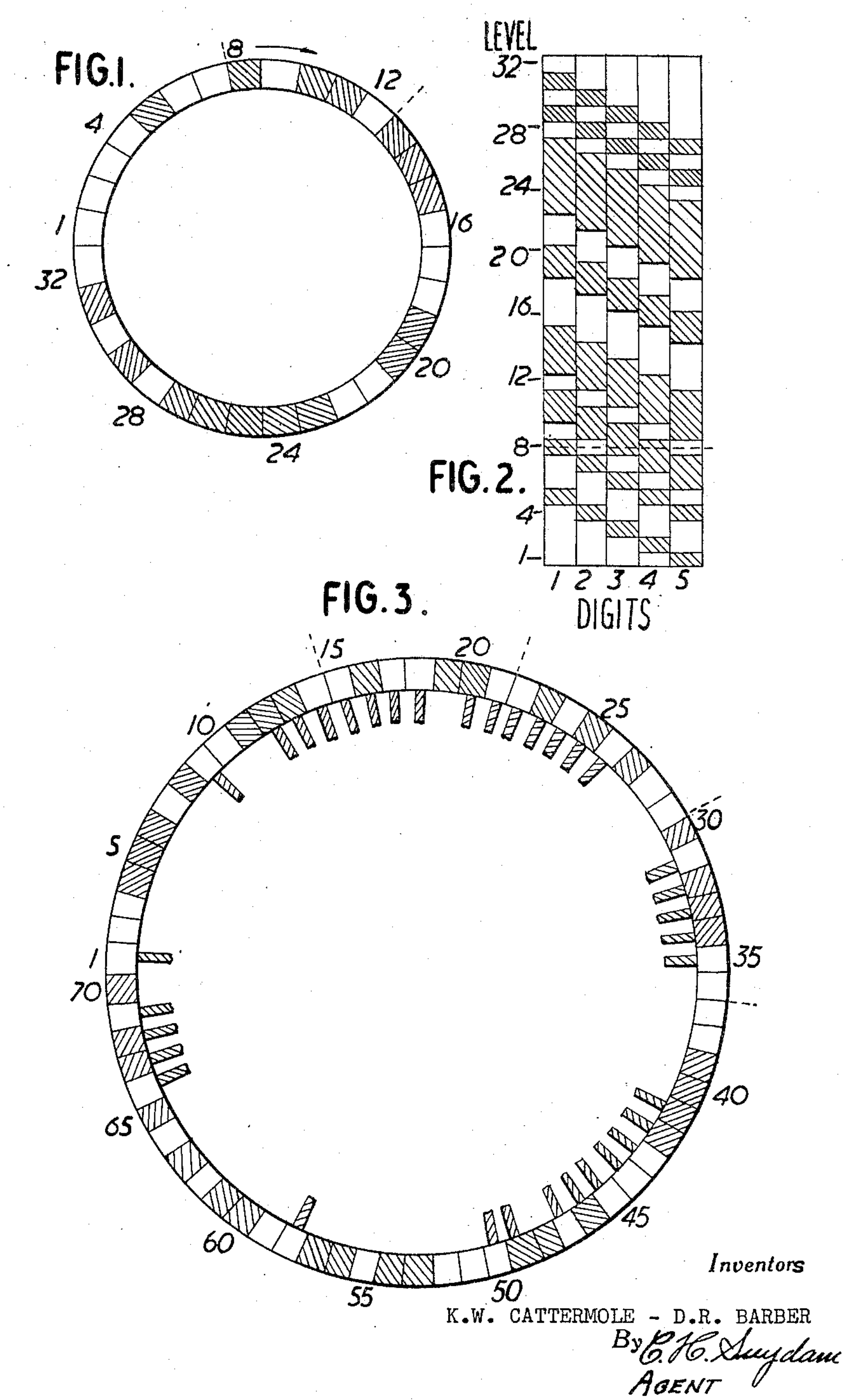
FIG. 1 shows a ring diagram of a five-digit serial binary code which may be used in a coder according to the invention.
FIG. 2 shows a diagram of a complete 5-digit code according to FIG. 1.
FIG. 3 shows a ring diagram of a seven-digit unit disparity code which may be used in a coder according to the invention.

The code on which the invention is based comprises one of certain particular forms of the binary code, which for convenience will be called a "serial binary code." It has been found that in the case of a binary code of $n$ digits, the $2^n$ possible code combinations can be allotted to the $2^n$ levels of the amplitude scale in such manner that the two code combinations corresponding respectively to every two adjacent levels contain the same block of $n-1$ successive digits: this block will be the first $n-1$ digits in one combination, and the last $n-1$ digits in the other. The whole code can then be represented by a complete ring of $2^n$ digits, half of which are marking digits and the other half spacing digits, arranged in such an order that every group of $n$ successive digits round the ring forms a different one of the $2^n$ possible combinations. The use of this code permits certain types of coder to be simplified, and enables the digit combinations to be produced directly in sequence on one conductor instead of simultaneously on separate conductors, as is commonly necessary when conventional binary codes are used.

Codes known as "cyclic error-detecting codes" are known. These codes are derived from the error-detecting codes used in telegraphy in which each code combination has the same number of marking digits. For example, in the case of a code of $2m$ digits, there will be $m$ marking digits in each code combination. A code with an odd number $2m-1$ of digits can be arranged in such manner that it has the property of the cyclic permutation code (namely that a change in one digit position only occurs for each change in amplitude level) and has the further property that the number of marking digits in each combination is always $m$ or $m-1$.

It has been further found that the code of $2m-1$ digits can be arranged in such manner that besides having either $m$ or $m-1$ marking digits in each combination it also has the property of a serial binary code explained above. Such a code, however, does not have the property of a cyclic permutation code. In cyclic error-detecting codes a $2m$th digit may be added so that all combinations have $m$ marking digits, the added digit being a spacing digit for all combinations with $m$ marking digits, and a marking digit for all combinations with $m-1$ marking digits. The added digit takes no part in representing any amplitude level. Such a code will for convenience be called a "serial error-detecting code," and is balanced, or has unit disparity, according as the number of digits is even or odd.

Although the serial binary codes according to the invention do not have the property of the cyclic permutation code, they have the same advantage when applied in the manner to be described, namely that coding errors due to uncertainties at the boundaries of the levels do not result in errors of more than one level.

As will be explained later, serial codes can be devised with disparity other than unity.

The digits of the code have been referred to above as "marking" and "spacing" digits for convenience. It will be understood that these digits are represented by digit pulses in pulse code modulation systems. In this specification a marking digit will be understood to be represented by the presence of a digit pulse of a given sign, and a spacing digit either by no pulse, or by a digit pulse of the opposite sign.

FIG. 1 shows one example of a diagram of a serial binary code of five digits. A circular band is divided into 32 segments, half of which are shaded to indicate marking digits. The unshaded segments indicate spacing digits. The segments are numbered clockwise from 1 to 32 and correspond in order to the 32 amplitude levels represented by the code. Then the code combination for any level $m$ is given by the group of 5 adjacent segments numbers $m$ to $m+4$ (or $m+4-32$ when $m+4$ is greater than 32), reading clockwise round the circle. Thus, for example, the combination for level 8 is $+-++-$, where "+" stands for a marking digit and "−" for a spacing digit.

The arrangement of the segments in FIG. 1 is such that every combination of 5 adjacent segments is different.

FIG. 2 shows a diagram of the code combinations so obtained for the 32 levels. Each vertical strip corresponds to a different digit, and the 32 levels are indicated by the scale on the left-hand side of the diagram. By drawing a horizontal line across the diagram at any level, the corresponding code combination can be determined.

Thus, for example, the combination for level 8 is $+-++-$ as already stated.

It will be clear that since the code arrangement is cyclic, any segment could be taken as No. 1, so that 32 different allocations are obtainable from FIG. 1. However, as will be pointed out later, there is sometimes an advantage in arranging so that the code combination for the highest level comprises five spacing digits.

An example will now be given of a serial error-detecting code, which is illustrated in the circle diagram FIG. 3 drawn on the same lines as FIG. 1. It is well known that an error-detecting code of $2m$ or $2m-1$ digits provides for N amplitude levels, where $N=2m!/m!m!$ The outer circle of FIG. 3 illustrates a code in which $m=4$, so that $N=70$, the code being a 7-digit-code with unit disparity. There are 70 segments in the circle, half of which are shaded, and they are arranged in such manner that a different combination is represented by each group of seven successive segments taken clockwise. The segments are numbered according to the corresponding amplitude levels as in FIG. 1. Thus the combination for level 15 is $-+---++-$, which has three marking digits, and that for level 30 is $+-+++--$ which has four marking digits. It is not believed necessary to set out the whole of the code in the manner of FIG. 2 since it can be derived so simply from FIG. 3.

It will be found that half the combinations have three marking digits and the other half have four marking digits. If it is desired to balance the code, then, as already explained, an eighth digit may be added to each combination, which will be a marking digit for those having only three marking digits and a spacing digit for the others. When a spacing digit is denoted by the absence of a pulse, no addition is, of course, made in the latter case. The extra marking digits necessary to balance the code are indicated in the detached segments of the inner circle of FIG. 3 opposite the level numbers of the combinations to which the corresponding marking digits are to be added. Spacing digits not shown in the inner circle are added to the other combinations.

Figure 4:
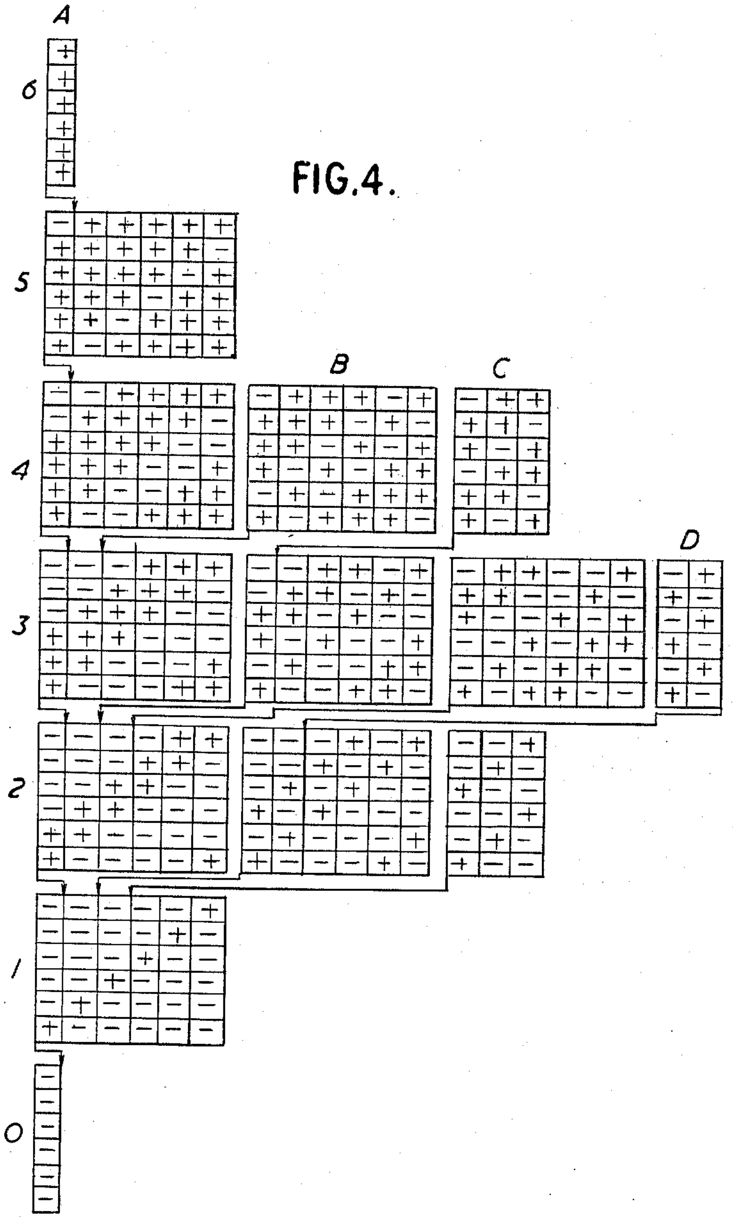
FIG. 4 shows a diagram illustrating a method of arranging a serial binary code for use in a coder according to the invention.

The diagram shown in FIG. 4 illustrates one method by means of which a serial code with any degree of disparity can be produced. The diagram relates to a six-digit code, but the same principles are applicable to a code of any number of digits. FIG. 4 shows all of the possible 64 different code combinations, arranged in blocks in seven horizontal rows. Each column of a block read downwards gives one code combination; and in each combination "+" represents a marking digit and "—" a spacing digit.

Each row of blocks contains all the combinations containing one particular number of marking digits, and the rows are numbered accordingly: thus all the combinations in row 4 have 4 marking digits. The blocks of code combinations in the rows are distinguished by the letters A, B, C, D reading from the left, as shown. Each block has six columns of code combinations except blocks 0A and 6A, which have only one column; blocks 2C and 4C, which have three columns; and block 3D, which has two columns.

In each block, the combinations are serially arranged, that is, the combination in any column is obtained by transferring the uppermost digit of the preceding column to the lowest position. Each block is also cyclic, since the combination in the first column to the left is obtained in the manner just stated from the last column to the right.

The manner in which the blocks are set out will be explained with reference to row 3, in which each combination has three marking digits. There are four different ways in which three marking and three spacing digits can be distributed.

(1) Three marking or three spacing digits occupying adjacent positions (block 3A: 6 combinations).

(2) An arrangement in which one combination read downwards is $--++-+$ (block 3B: 6 combinations).

(3) The inverse of (2) (block 3C: 6 combinations).

(4) Marking and spacing digits arranged alternately (block 3D: 2 combinations).

The blocks with 4, 5 and 6 marking digits are set out systematically in the same manner in rows 4, 5 and 6, there being a total of 15 combinations in row 4, 6 in row 5 and one in row 6. Rows 0, 1 and 2 contain combinations which are the inverse of the combinations in rows 6, 5 and 4 respectively. However, it should be pointed out that the columns do not directly correspond but have been cyclically rearranged for a reason which will become clear later. Thus, for example, column 1 of block 2A is the inverse of column 3 of block 4A.

It will be understood that any block may be cyclically rearranged without upsetting the serial property of the combinations in that block.

Since the combinations of each separate block have the serial property, it is possible to find places in a block or blocks of one row where a block of the next row above can be inserted between two columns, so that all the combinations so obtained, read from left to right, still have the serial property. These insertions are indicated by the arrows in FIG. 4. Thus block 3A can be inserted between columns 1 and 2 of block 2A, since the combination in column 1 of block 3A can be obtained by omitting the upper spacing digit of column 1 of block 2A and adding a marking digit below; and the combination of column 2 of block 2A can be obtained by omitting the upper marking digit of column 6 of block 3A and adding a spacing digit below. Thus the series of 8 combinations so obtained will have the required serial property. The same will be found to be true for all the insertions indicated in FIG. 4. These insertions are as follows:

(*a*) Block 1A after block 0A.

(*b*) Blocks 2A, 2B and 2C after columns 1, 2 and 3 respectively of block 1A.

(*c*) Blocks 3A, 3B and 3C after columns 1, 2 and 3 respectively of block 2A; and block 3D after column 2 of block 2B.

(*d*) Blocks 4A and 4B after columns 1 and 2 respectively of block 3A; and block 4C after column 1 of block 3B.

(*e*) Block 5A after column 1 of block 4A.

(*f*) Block 6A after column 1 of block 5A.

In this way all the 64 possible combinations of 6 digits will be arranged in an order which has the serial property, starting from $------$ (block 0) and ending with $+-----$ (column 6, block 1A). Since the whole series is cyclic, any combination may be chosen to represent zero signal level, for example, and then increasing levels may be represented respectively by the following combinations in cyclic order.

It will be understood that various insertions other than those shown in FIG. 4 are possible for obtaining a serial code, and if necessary, the columns of any block may be cyclically re-arranged so that this can be done.

It should be pointed out that serial codes with any degree of disparity can be derived from FIG. 4 simply by omitting those rows having a disparity greater than that desired. For example, if a disparity not exceeding two is required, rows 0, 1 and 5 and 6 are omitted and the code series then begins with column 1 of block 2A and ends with column 3 of block 2C, the total number of combinations being 50.

If a balanced serial code is required (that is, one in which each combination contains three marking digits and three spacing digits), only six combinations are available, namely those of block 3A, 3B or 3C. There is no means of combining two or more of these blocks in such a way that the serial property is preserved.

It should be further pointed out that a serial code with other types of disparity can be derived directly from FIG. 4. For example, if the code is to have not more than, say, 4 marking digits, then rows 5 and 6 are omitted. The inverse of this code will have not more than four spacing digits. Codes with this type of disparity may be useful in some circumstances.

The procedure explained with reference to FIG. 4 may obviously be applied to a code with any number of digits. The cyclic blocks will be arranged in $n+1$ rows for a code of $n$ digits, numbered from 0 to $n$ as in FIG. 4, and then it is easy to show that the number of combinations in the $r$th row will be $n!/(n-r)!r!$, so that the total number of combinations available will be $\Sigma n!/(n-r)!r!$ where $r$ takes the values of the rows which are used in constructing the code. When $n$ is odd the disparity can have any odd number not exceeding $n$, while when it is even the disparity will be zero or any even number not exceeding $n$. However, with an even number of digits, a zero disparity serial code cannot have more than $n$ combinations, and this will probably have little practical value. It would be better in this case to employ a unit disparity serial code of $n-1$ digits and to add an $n$th digit for balancing the code in the manner explained with reference to FIG. 3. In this case the number of combinations available will be $$2\times n!/[\tfrac{1}{2}(n+1)]![\tfrac{1}{2}(n-1)]!$$

which is equal to 20 when $n=5$.

When $n$ is odd the $\tfrac{1}{2}(n+1)^{\text{th}}$ and $\tfrac{1}{2}(n-1)^{\text{th}}$ rows have the same number of blocks, the combinations in one row being inverse to those in the other row.

Figures 5, 6:
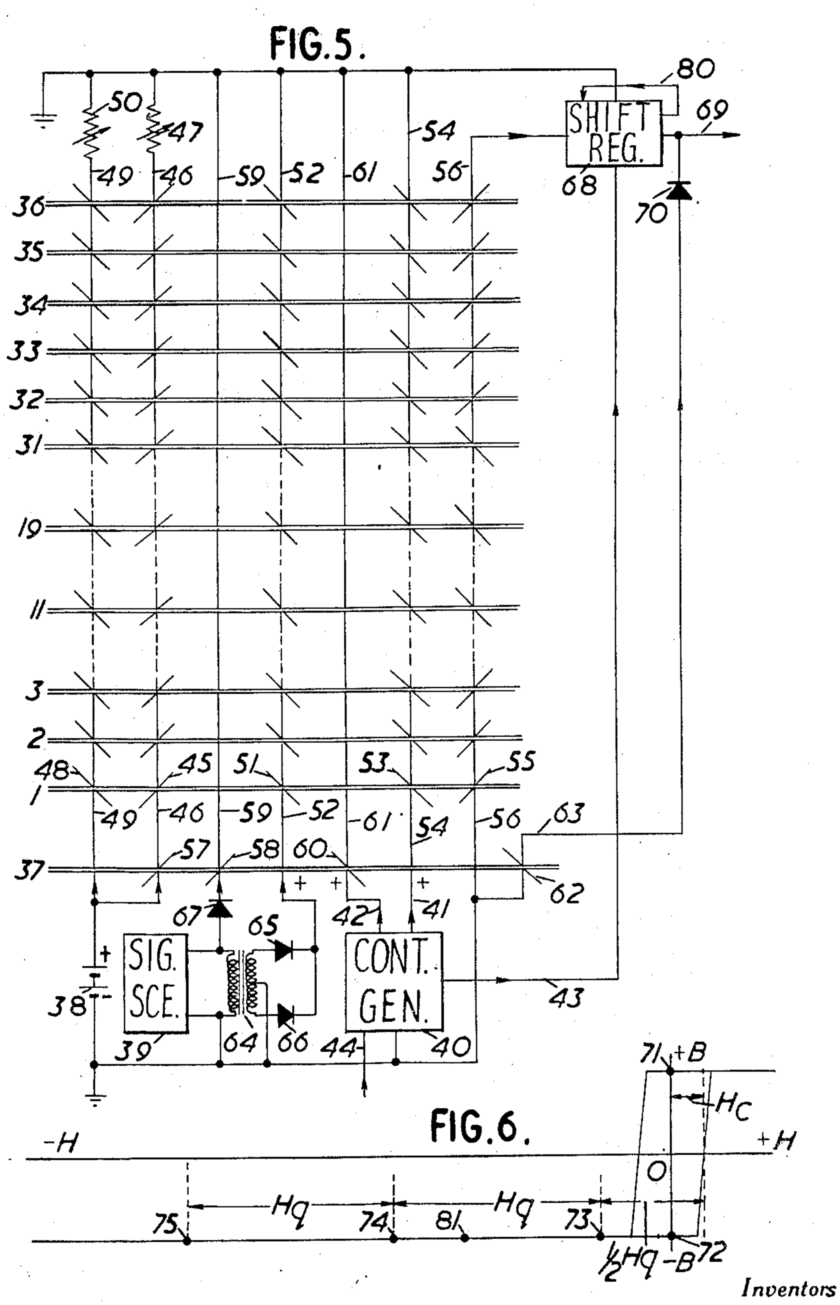
FIG. 5 shows a schematic circuit diagram of a coder according to the invention employing a six digit code.
FIG. 6 shows a hysteresis curve used in the explanation of the operation of FIG. 5.

An example is illustrated in FIG. 5 of the use of the five-digit code illustrated in FIGS. 1 and 2. The coder shown is of the magnetic type similar to that described, for example, in the specifications of co-pending application No. 708,186 filed January 10, 1958, now Patent No. 2,954,550 and co-pending application No. 800,708 filed March 20, 1959, and comprises cores of ferrite or other suitable magnetic material with a substantially rectangular hysteresis curve, provided with appropriate windings.

In order to simplify the drawing, the cores and windings are diagrammatically shown. Each core is represented by a thick horizontal straight line, and a winding on the core is represented by a short inclined line, and the direction of slope of the short lines indicates the direction of winding. Thus a line sloping upwards to the left will be taken to indicate a winding wound "straight" while a line sloping upwards to the right will be taken to indicate a winding wound "reverse." A thin line drawn at right angles to the cores through the points where the inclined winding lines intersect the cores indicates a conductor with which all the corresponding windings are in series. If a conductor crosses a core at a point where there is no inclined line, this signifies that that core has no winding in series with that conductor. In what follows, the inclined lines will be called "windings" and such windings may have various numbers of turns, as may be required.

The coder shown in FIG. 5 provides for 32 positive and 32 negative amplitude levels. The signal amplitude is coded irrespective of sign by means of the five-digit code shown in FIG. 2, and a sixth digit separately obtained indicates the sign. The coder comprises 32 similar magnetic cores of ferrite or other suitable material having a hysteresis curve similar to that shown in FIG. 6. These 32 cores correspond respectively to the 32 positive or negative amplitude levels, and are designated 1 to 32. Four additional cores 33 to 36 are also provided to produce the complete sets of digit pulses for levels 29 to 32. A further core 37 provides the sign digit pulse. The cores are arranged in a regular series and not all of them have been shown.

The coder is operated by a direct current bias source 38 with its negative terminal connected to ground; a source 39 of a balanced signal wave to be coded; and a control generator 40 having one terminal connected to ground, three output terminals 41, 42 and 43, and an input conductor 44 for a synchronising signal.

Each of the cores 1 to 36 has a main bias winding 45 connected in series with a conductor 46 between the positive terminal of the source 38 and an adjustable resistor 47 which is connected to ground. Each of the said cores has also an auxiliary bias winding 48 connected in series with a conductor 49 between the positive terminal of the source 38 and a second adjustable resistor 50 which is also connected to ground. All the main bias windings are connected "reverse" and the auxiliary bias windings are connected "straight". All the auxiliary bias windings have the same number of turns $a$, but the number of turns of the main bias windings is different for the different cores. For the core No. $m$, the number of turns of the main bias winding is $mb$ where $b$ is a constant integer.

Each of the cores 1 to 36 has a signal winding 51 wound "straight", all such windings being connected in series with a conductor 52 connected to ground at the upper end. All the signal windings have the same number of turns $c$.

Each of the cores 1 to 36 has a trigger winding 53 wound "straight", all such windings being connected in series with a conductor 54 connected to ground at the upper end. All the trigger windings have the same number of turns $d$.

Finally, each of the cores 1 to 36 has an output digit winding 55 connected in series with a conductor 56 connected to ground at the lower end. All the output digit windings have the same number of turns $e$, and in the case of cores 1 to 32, the output digit winding 55 is wound "straight" or "reverse" according as the corresponding numbered segment of the ring shown in FIG. 1 indicates a marking or a spacing digit: thus, for example, for core No. 3 the winding 55 is wound "reverse", and for core No. 11 it is wound "straight". Cores 33 to 36 have output digit windings wound "reverse" in each case, corresponding to segments 1 to 4 of FIG. 1.

The sign core 37 has a main bias winding 57 with $f$ turns connected in series with conductor 46 and wound "reverse"; a signal winding 58 with $g$ turns and wound "reverse" and connected in series with a conductor 59 connected to ground at its upper end; a trigger winding 60 with $d$ turns wound "straight" and connected in series with a conductor 61 connected to ground at its upper end; and an output digit winding 62 with $h$ turns wound "straight" and connected in series with a conductor 63 connected to ground at its lower end. Conductors 46, 49, 52, 54 and 56 are shown dotted in places to indicate the presence of other windings on cores not shown.

It will be understood that the numbers of turns $a$, $b$ etc. for the various windings on the cores may have any convenient values: at least some of these numbers can often be equal to 1.

The signal wave source 39 is connected through a transformer 64 to two rectifiers 65, 66 which form a full-wave rectifier circuit, and which are connected to the lower end of conductor 52. The centre tap of the secondary winding of the transformer 64 is connected to ground. The rectifiers 65, 66 are directed so that the signal voltage applied to conductor 52 is always positive. One terminal of the primary winding of the transformer 64 is connected to conductor 59 through a rectifier 67 directed so that only when the last mentioned terminal is positive is any appreciable current supplied to the winding 58. The other terminal of the primary winding is connected to ground.

The output conductors 41 and 42 of the control generator 40 are connected respectively to conductors 54 and 61.

The upper end of conductor 56 is connected to a shift register 68 which stores up the five digits of each code combination produced by the output digit windings 55 and delivers them later to an output conductor 69, in response to reading-out pulses supplied from the generator 40 over conductor 43. Conductor 63 is connected through a rectifier 70 to conductor 69. The rectifier is directed to block any negative pulses coming from conductor 63.

The operation of the circuit will be explained with reference to FIG. 6, which shows a hysteresis curve of the material of the cores. If there is no current in any winding of one of the cores, it will be in the condition represented by the point 71 or 72, according to its previous treatment. If a negative magnetic field is applied to the core, its condition will be represented by some point on the lower part of the curve.

The current through the main bias windings 45 is adjusted by means of resistor 47 so that a negative magnetic field H$q$ is applied to the core No. 1, where H$q$ should be large compared with H$c$, the coercive force. H$q$ then corresponds to the quantum difference between two adjacent signal amplitude levels. The current through the auxiliary bias windings 48 is then adjusted by means of the resistor 50 so that a positive magnetic field $(\frac{1}{2}Hq-Hc)$ is applied to each of the cores. Then the total bias field applied to core No. $m$ will be $$-(m-\tfrac{1}{2})Hq+Hc$$

disregarding the sign core 37. The bias conditions of the cores 1 to 36 will thus be represented in FIG. 6 by points on the lower branch of the curve equally spaced by $Hq$. The points for cores 1 to 3 are designated 73 to 75, and the points for the remaining cores extend further to the left at equal intervals of $Hq$. The point 73 for core No. 1 is at a distance of $\frac{1}{2}Hq-Hc$ from the B— axis.

The signal voltage applied to conductor 52 adds a positive signal magnetic field H$s$ to each core, which effectively moves the corresponding bias point by a distance H$s$ to the right. Thus the condition of some of the cores will then be represented by points (not shown) on the upper branch of the hysteresis curve.

The control generator 40 (FIG. 5) is triggered over conductor 44 by timing pulses derived from a conventional distributor (not shown) which pulses correspond, for example, to the channel of a multichannel communication system to which the signal source 39 belongs. Each timing pulse determines the channel period during which the code pulses of that channel are to be transmitted. In response to each timing pulse, the generator 40 produces in conventional manner three control waves shown in graphs A, B and C, of FIG. 7. The triggering wave A which is supplied to the output terminal 41, consists of a single sawtooth current wave 76 commencing at zero current and rising to a maximum positive current which slightly exceeds the current necessary to produce a magnetic field 5H$q$ in each of the cores 1 to 36. The sawtooth wave is succeeded by a negative current portion 77 of preferably half-sinewave form and of amplitude exceeding that corresponding to a magnetic field $5Hq+2Hc$ in each core. The negative portion restores the cores to the normal condition after triggering.

The control wave B comprises a single positive current pulse 78 which is timed to occur shortly after the negative portion 77 of the wave A, and is supplied to the output conductor 42 of the generator 40 and is used to trigger the sign core 37. The control wave C comprises five similar read-out positive pulses 79 following in succession after the pulse 78, and is supplied to conductor 43. The pulse 78 of graph B, and the five pulses 79 of graph C preferably form a series of six equally spaced pulses.

Figures 7, 8, 9:
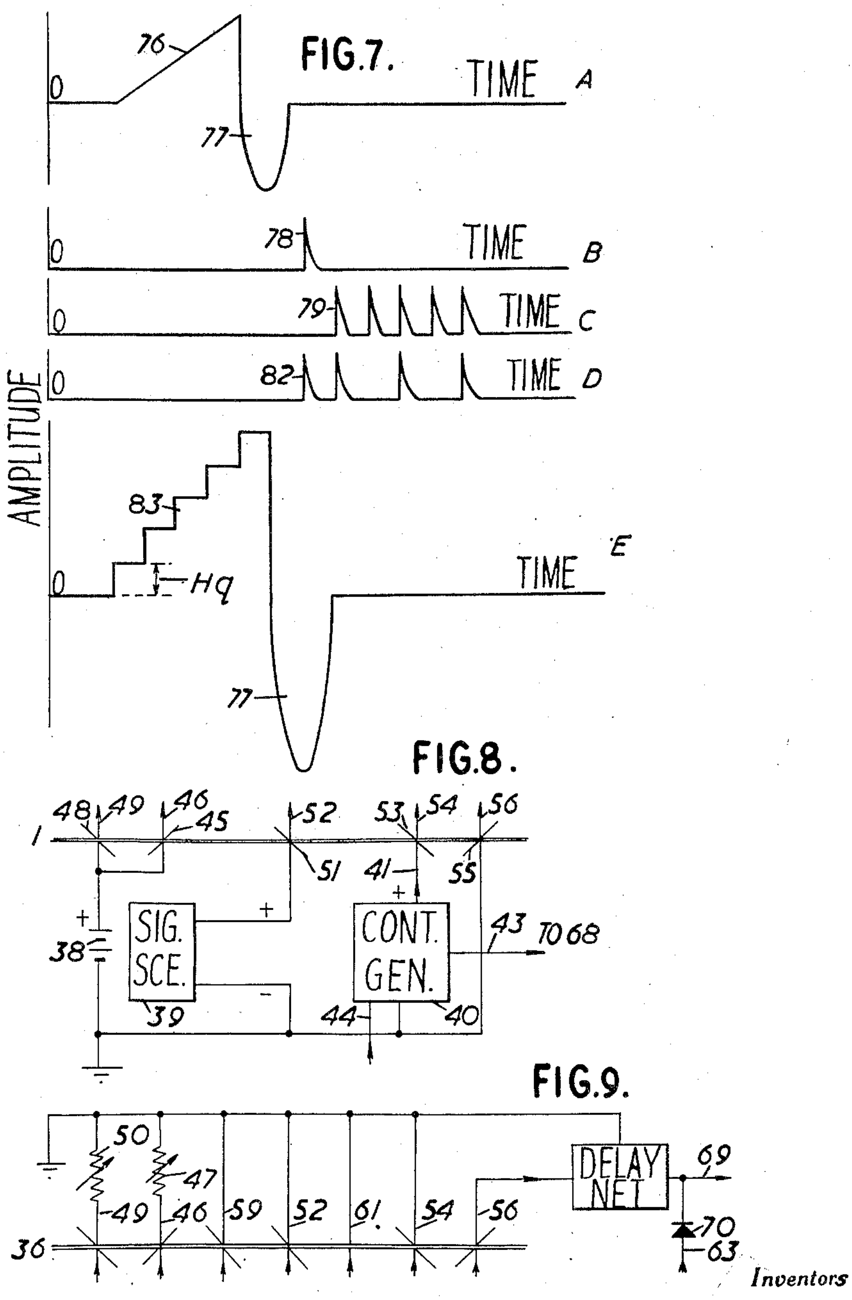
FIG. 7 show waveform graphs used in the explanation of the operation of FIG. 5.
FIG. 8 shows a modification of the lower part of FIG. 5.
FIG. 9 shows a modification of the upper part of FIG. 5.

To explain the operation of the coder, it will first be assumed that the signal amplitude is zero. Then it will be clear that the cores are in the conditions represented by the points 73, 74, 75 etc. of FIG. 6. The effect of the portion 76 of the control wave A FIG. 7 is to move all these points simultaneously to the right by a total distance slightly exceeding 5H$q$. As each point passes the lower righthand corner of the hysteresis curve, the corresponding core will be triggered and a digit pulse will be generated. It will be clear that cores 1 to 5 will be triggered and no more, since the bias point corresponding to core No. 6 will only reach the point 73 of FIG. 6 at the termination of the sawtooth portion 76 of the wave A. Thus since the digit windings are placed on the cores 1 to 5 according to the first five segments of the ring in FIG. 1, the code combination supplied to the shift register 68 will be — — — — +. The cores which have been triggered will be restored by the portion 77 of the control wave A, and will supply to the register 68 five more digit pulses in the inverse combination

+ + + + —

The register 68, however, is of the type which on receipt of 5 digit pulses switches itself off over conductor 80 and is then unaffected by any further pulses, so that it ignores the digit pulses produced by the restoration of the cores.

It will be evident that if the field due to the signal amplitude is just less than ½H$q$, the same code combination is supplied to the shift register 68, but the digit pulses will be generated somewhat later than before. If, however, the field due to the signal amplitude exceeds ½H$q$, core No. 1 will already be in the condition corresponding to a point on the upper branch of the curve (FIG. 6), and will not be triggered by the sawtooth wave 76. In this case the core which is first triggered will be No. 2, and the five cores 2, 3, 4, 5 and 6 will now be triggered. The digit combination sent out will thus be — — — + —, according to FIG. 1, and this combination will be sent out for all signal amplitudes producing fields between ½H$q$ and 1½H$q$. If the field due to the signal amplitude just exceeds 1½H$q$, core No. 3 will be the first to be triggered. Thus, in general, if the field due to the signal amplitude lies between $(m-\frac{1}{2})Hq$ and $(m-1\frac{1}{2})Hq$ the $m^{th}$ core will be the first to be triggered. Thus if, for example, $m=20$ the code combination

+ — — + + will be sent out for signal amplitudes producing fields between 18½H$q$ and 19½H$q$, which can be seen by reference to FIG. 1.

It will be noted that the code in FIG. 1 has been so arranged that the combination for level 32 is

— — — — —

Thus for the maximum signal amplitude producing a field 31½H$q$ ($m$=32), core 32 is the first to be triggered, and the four extra cores 33 to 36 provide the last four spacing digits. Levels 28 to 31 require the last 1 to 4 digits, respectively, to be spacing digits, and these are correctly provided by the cores 32 to 35.

Preferably, the signal amplitude should be limited by appropriate means so that the corresponding field does not exceed 31½H$q$.

By means of the arrangements described so far, the same five digit code is produced whether signal amplitude is positive or negative. A sixth sign digit is produced by the sign core 37 in the following way. The bias winding 57 is given a sufficient number of turns to bias the core 37 well to the left of the B— axis in FIG. 6. For example, the winding 57 may have the same number of turns as the winding 45 on core No. 1, namely $b$ turns. It will then be biased to a point 81 between the points 73 and 74, distant H$q$ from the B— axis. The amplitude of the triggering pulse 78 (graph B, FIG. 7) supplied by the control generator 40 to the winding 60 should then be such that the magnetic field applied to the core 37 exceeds H$q$+H$c$ so that the core 37 will be triggered by the pulse 78, in the absence of any magnetic field produced by the signal winding 58. This winding 58 should however be provided with a sufficiently large number of turns to ensure that if the signal amplitude is positive and corresponds to a small fraction of H$q$, the core 37 is biased far to the left in FIG. 6, that the triggering pulse 78 cannot trigger the core. If the signal amplitude is negative, the rectifier 67 will be blocked and no appreciable bias current can be supplied to the winding 58. Thus a sign digit pulse 82 (graph D, FIG. 7) is delivered from the digit winding 62 over conductor 63 to the output conductor 69 only if the signal amplitude is negative.

The disappearance of the triggering pulse 78 will cause the restoration of the sign core 37, and an unwanted negative pulse will thereby be produced. This is eliminated by the rectifier 70, which only passes positive pulses.

The read-out pulses 79 (graph C, FIG. 7) which are supplied from the generator 40 to the shift register 68 cause it to deliver the stored up digit-pulses to the conductor 69 preferably in the form of positive pulses for marking digits and no pulses for spacing digits. Thus, for example, the six-digit code for negative level 27 is shown in graph D, FIG. 7; for positive level 27 the initial sign pulse 82 will be absent.

Owing to the fact that the sides of the hysteresis curve shown in FIG. 6 are not quite normal to the H-axis, there will be some uncertainty when the signal level substantially corresponds to $(m-\frac{1}{2})Hq$ as to which core will be the first to be triggered. This uncertainty can be reduced by increasing Hq, but in any case the coding error cannot exceed one quantum level. The arrangement therefore has the same advantage as the conventional cyclic permutation coders. It should also be noted that when the signal level corresponds nearly to $$(m-\frac{1}{2})Hq$$

six cores might be triggered instead of five. However, the triggering of the sixth core has no effect since the shift register 68 will ignore the sixth digit pulse.

The coder shown in FIG. 5 can evidently be extended for a code with any number of digits by providing $N+n-1$ cores, and a sign core, where N is the total number of levels represented by the code and $n$ is the number of digits of the code. The digit windings 55 are wound "straight" or "reverse" in accordance with the segments of the coresponding ring diagram. Thus, for example, in the case of a seven-digit code with unit disparity, $N=70$, $n=7$ and the digit windings are arranged on the cores according to the ring diagram, FIG. 3.

If the voltage from the signal source 39 (FIG. 5) is of one sign only, for example, positive, then the arrangement of FIG. 5 is modified by omitting the sign core 37 and its windings, and elements 42, 59, 61, 63 to 67, and 70, and by connecting conductor 52 directly to the upper terminal of the source 39, as shown in FIG. 8.

In this case the arrangement can represent 32 positive levels. If it is desired to represent 64 positive levels, then a six digit code is necessary and 69 cores should be provided arranged according to the same plan as those of FIG. 5.

In the arrangement shown in FIG. 5 the shift register 68 is required because the code combinations are generated by the cores 1 to 36 at varying times, depending on the signal amplitude, so it is necessary to store them temporarily so that they can be transmitted at the proper time. According to a modification of the arrangement, the shift register 68 can be omitted if a different triggering wave is used. The triggering wave in this case is shown by graph E of FIG. 7 and is a stepped wave 83 having five positive steps each of height corresponding to Hq, the leading edges being as steep as possible. The wave 83 is followed by a negative restoring wave 77 as in graph A. In this case five cores will be triggered in succession as before, but the triggering times are now determined by the leading edges of the steps and do not depend on the signal amplitude. It is now possible to deliver the code pulses directly to the output conductor 69, or if desired, a delay network 84 may be interposed, as shown in FIG. 9.

The duration of each of the steps in the triggering wave 83 may be chosen equal to the time spacing desired for the digits of the code.

It should be mentioned that if the triggering wave is that shown in graph E, FIG. 7, so that the output arrangements are those shown in FIG. 9, a code in which the marking digits are denoted by positive pulses and the spacing digits are denoted by absence of pulses, can be obtained by the arrangement of FIG. 5 by omitting more than half the cores. Since spacing digits are indicated by absence of pulses, all the "reverse" digit windings in FIG. 5 are not required, which means that the corresponding cores have no function. Accordingly by reference to FIG. 1 it can be seen that the only cores which it is necessary to provide are Nos. 5, 8, 9, 10, 13, 14, 15, 19, 20, 23 to 27, 29, and 31, together with the sign core 37 if the signal wave is balanced. The number of turns of the main bias windings 45 of the cores which are retained will be $mb$ as before where $m$ is the number of the core concerned.

It will be noted that with this arrangement since the code combination for level 32 is — — — — —, limiting of the maximum signal amplitude is not very important since the code combination for anything above the maximum will be the same as for level 32, and no combination representing some lower level can be produced. Thus limitation occurs in effect in the coding process. This indicates the advantage of choosing the code so that the maximum level is represented by an all-space combination.

It should be pointed out, however, that when a unit disparity serial code is used, such as that illustrated in FIG. 3, the all-space combination is not one of the combinations used, and therefore the last-mentioned advantage cannot be obtained and it is necessary to limit the signal amplitude before coding.

While in FIG. 5 the cores are shown diagrammatically as straight bars, in practice they will preferably be small toroidal cores of suitable ferrite or other magnetic material having a nearly rectangular hysteresis curve.

It should be mentioned that there are other forms of triggering wave besides that illustrated in graph E, FIG. 7 which can be used to avoid storing the digit pulses in a storage device such as the shift register 68, FIG. 5. In one such triggering wave, the portion corresponding to the portion 83 (graph E) comprises an initial very steep leading edge which rises until the first core is triggered, and the emission of the corresponding digit pulse is then made to operate a trigger device which reduces the rate of increase of the triggering wave amplitude so that it follows substantially the portion 76 of the wave in graph A, FIG. 7. In this way the steep leading edge determines the time of emisison of the first digit pulse irrespective of the signal wave amplitude, and then the succeeding digit pulses follow at the proper intervals. This type of triggering wave may be preferably to that shown in graph E, FIG. 7, because the latter has to be generated with some considerable degree of accuracy, while the modified wave just described does not require such accuracy.

It will be understood that the cores with their windings illustrated in FIG. 5 are particular forms of trigger devices which can be triggered by a triggering voltage, or cannot be triggered, according to the total effective bias applied to them. It will be clear to those skilled in the art that exactly similar operations could be carried out with other types of trigger devices, such for examples, as two-condition multivibrator devices which are easily arranged to produce either a marking or a spacing output digit pulse on being triggered.

While the principles of the invention have been described above in connection with specific embodiments, and particular modifications thereof, it is to be clearly understood that this description is made only by way of example and not as a limitation on the scope of the invention.

What we claim is:

1. A coding arrangement for a pulse code modulation system in which the amplitude of a signal wave is represented according to a scale of N-discrete amplitude levels, each level being represented by a different code combination according to a binary code of $n$ digits comprising: means for generating a code combination corresponding to each level in which the combinations respectively representing any two adjacent amplitude levels have the same succession of $n-1$ adjacent digits; said generating means comprising a plurality of biased trigger devices, each corresponding to a different amplitude level and biased to a value representative of its corresponding level; means for applying the signal wave to all trigger devices at a polarity to reduce the bias of each trigger device by the same amount, means for applying a triggering wave to all the trigger devices to trigger in sequence $n$ of said trigger devices corresponding to amplitude levels $m$ to $(m+n-1)$, where $m$ is the number of the level of the signal wave amplitude, and means for deriving from each of the triggered trigger devices one of the $n$ digit elements having a marking or spacing condition according to the code combination corresponding to amplitude level $m$.

2. A coding arrangement according to claim 1 in which $n$ is odd, and in which said means for generating is arranged to produce only such code combinations as contain $\frac{1}{2}(n-1)$ or $\frac{1}{2}(n+1)$ marking digits.

3. A coding arrangement according to claim 1 in which said means for generating is arranged to produce only such code combinations as contain not more than $r$ marking digits (or not more than $r$ spacing digits) where $r$ is less than $n$.

4. A coding arrangement acording to claim 1 in which N trigger devices are provided and in which $n-1$ additional trigger devices are provided corresponding respectively to $n-1$ extra levels, for producing all the $n$ digits required for each of the levels $N-n+2$ to N inclusive.

5. A modification of the coding arrangement according to claim 4, which employs a code in which marking digit elements are represented by digit pulses of a given sign, and spacing digit elements are represented by the absence of digit pulses.

6. A coding arrangement according to claim 4 in which the triggering wave is of single saw-tooth form with a total change of amplitude equivalent to $n$ times the amplitude difference between two adjacent amplitude levels.

7. A coding arrangement according to claim 6 in which the output digit elements derived from the $n$ triggered trigger devices are stored temporarily in a storage device, and means connected to said storage device to, at a subsequent time, deliver said stored pulses in sequence to an output circuit.

8. A coding arrangement according to claim 4 in which the triggering wave consists of a wave whose amplitude increases by $n$ separate equal steps having steep leading edges, the amplitude increase corresponding to each step being equivalent to the amplitude difference between two adjacent amplitude levels.

9. A coding arrangement for a pulse code moduation system in which the amplitude of a signal wave is represented according to a scale of N discrete amplitude levels, each level being represented by a different code combination according to a binary code of $n$ digits comprising: means for generating a code combination corresponding to each level in such manner that the combinations respectively representing any two adjacent amplitude levels have the same succession of $n-1$ adjacent digits; said generating means comprising a plurality of biased trigger devices, each corresponding to a different amplitude level and biased to a value representative of its corresponding level; means for applying the signal wave to all trigger devices in such manner as to reduce the bias of each trigger device by the same amount, and means for applying a triggering wave to all the trigger devices in such a manner that $n$ of the said trigger devices corresponding to amplitude levels $m$ to $(m+n-1)$ inclusive are successively triggered, where $m$ is the number of the level of the signal wave amplitude; and means for deriving from each of the trigger devices which is triggered a corresponding marking or spacing output digit element according to the code combination corresponding to amplitude level $m$, said scale of N discrete amplitude levels containing an equal number of N positive and N negative amplitude levels further comprising: means for rectifying said signal wave before applying it to said trigger devices in such manner that a rectified signal wave is produced whose amplitude has always one given sign but is substantially equal in magnitude to the amplitude of the signal wave, an extra trigger device adapted to indicate the sign of the signal wave amplitude, means for applying a triggering pulse to trigger the extra triggering device, means for applying the unrectified signal wave to prevent the extra triggering device from being triggered if the signal amplitude has one specified sign, and means for deriving an $(n+1)^{th}$ digit element in response to the triggering of the extra triggering device.

10. A coding arrangement according to claim 9 in which each triggering device comprises: a core of magnetic material having a hysteresis curve with sharp discontinuities on which core are wound one or more bias windings, a winding to which the signal wave is supplied, a triggering winding to which the triggering wave or pulse is supplied, and an output winding from which an output digit pulse is obtained in response to the triggering of the core.

11. A coding arrangement according to claim 10, in which the output windings of all the cores except that corresponding to the extra triggering device are connected in series with a single output conductor.

References Cited in the file of this patent

UNITED STATES PATENTS

| | | |
|---|---|---|
| 2,734,183 | Rajchman | Feb. 7, 1956 |
| 2,925,469 | Metzger | Feb. 16, 1960 |
| 2,954,550 | Starr et al. | Sept. 27, 1960 |